(12) United States Patent
Jeon

(10) Patent No.: US 10,009,869 B2
(45) Date of Patent: Jun. 26, 2018

(54) METHOD, DEVICE AND SYSTEM FOR ESTIMATING LOCATION

(71) Applicant: SK Planet Co., Ltd., Seongnam-si, Gyeonggi-do (KR)

(72) Inventor: Jinho Jeon, Seoul (KR)

(73) Assignee: SK PLANET CO., LTD., Seongnam-si (KR)

( * ) Notice: Subject to any disclaimer, the term of this patent is extended or adjusted under 35 U.S.C. 154(b) by 0 days. days.

(21) Appl. No.: 15/281,069

(22) Filed: Sep. 30, 2016

(65) Prior Publication Data
US 2017/0188326 A1    Jun. 29, 2017

(30) Foreign Application Priority Data

Dec. 29, 2015  (KR) .......................... 10-2015-0188209
Dec. 29, 2015  (KR) .......................... 10-2015-0188211

(51) Int. Cl.
| H04W 64/00 | (2009.01) |
| G01S 5/02 | (2010.01) |
| G01S 5/14 | (2006.01) |
| H04W 88/08 | (2009.01) |

(52) U.S. Cl.
CPC ............... H04W 64/00 (2013.01); G01S 5/02 (2013.01); G01S 5/0252 (2013.01); G01S 5/0263 (2013.01); G01S 5/14 (2013.01); *H04W 88/08* (2013.01)

(58) Field of Classification Search
CPC ......... H04W 64/00; H04W 88/08; G01S 5/14; G01S 5/0252
See application file for complete search history.

(56) References Cited

U.S. PATENT DOCUMENTS

2007/0247367 A1*  10/2007  Anjum .................. H04W 64/00
                                                                     342/464
2011/0306354 A1*  12/2011  Ledlie .................. G01S 5/0252
                                                                     455/456.1

* cited by examiner

*Primary Examiner* — Chuong A Ngo
(74) *Attorney, Agent, or Firm* — Brinks Gilson & Lione

(57) ABSTRACT

Provided are a method, device and system for estimating the location of a user device by using radio signals emitted from access point (AP) devices. In the location estimating method implemented by the user device may include steps of measuring received signal strength of a signal received from two or more AP devices deployed within a specific range, establishing a binding box for each of the two or more AP devices by using the measured received signal strength, and estimating a current location of the user device by using points of contact between the established binding boxes.

15 Claims, 17 Drawing Sheets

METHOD, DEVICE AND SYSTEM FOR
ESTIMATING LOCATION

TECHNICAL FIELD

The present invention relates generally to location estimation technology and, more particularly, to a method, device and system for estimating a user location by using received signals.

BACKGROUND

Details disclosed in this section merely offers background information regarding embodiments of the present invention. No determination has been made, and no assertion is made, as to whether any of the below might be applicable as prior art with regard to the present invention.

Normally, a location based service (LBS) is a system and service for tracking, identifying and utilizing the location of a person or thing, based on a wired/wireless communication network. Namely, using positioning or location-estimating technique, the LBS determines in real time the location of a user (i.e., a subscriber) of a mobile communication device, such as a smart phone or a cellular phone, and offers the determined location to the user.

As to the LBS, a variety of techniques such as a global positioning system (GPS), Wi-Fi geotagging, triangulation using base stations, and the like are known in the art. Recently, Wi-Fi positioning system (WPS) technique based on wireless local area network (WLAN) is also known.

The WPS refers to technique to allow a user's terminal device to receive parameters (e.g., a media access control (MAC) address, signal strength, etc.) of radio frequency (RF) signals emitted from access point (AP) devices and also allow a WPS server to compute and determine the location of the terminal device (i.e., a user location) by using positioning technique.

A typical location-estimating technique using AP devices has, however, a problem of requiring a complicated mathematical computation. It is therefore difficult to apply this technique to a device with low performance. Even though being applied actually, this technique has a burden of much time to estimate a user location due to a complicated computation process.

Additionally, such a location-estimating technique using AP devices is often used for estimating a user's indoor location. However, when a user is in a multi-floor structure, it is not easy to exactly know what floor a user is located on.

SUMMARY

In order to address the aforesaid or any other issue, the present invention provides a method, device and system for efficiently and exactly estimating the location of a user device by using radio signals emitted from AP devices but requiring no complicated mathematical computation.

Additionally, in case there is a plurality of AP devices within a specific range of a user device, this invention estimates the location of the user device by using emission signals of selected AP devices only which satisfy a predetermined condition, rather than by using all AP devices. Namely, the method, device and system of this invention establish a binding box, of each selected AP device, being inversely proportional to received signal strength and then estimate the location of the user device from points of contact between the binding boxes. This may greatly simplify a computation process for location estimation.

Also, in order to estimate the location of the user device by using altitude information obtained through an altitude sensor, the method, device and system of this invention may further consider a reference point and related inter-floor information. This may enhance the accuracy of location estimation in comparison with a typical case of merely using altitude information.

The present invention is not limited to the above object, and any other object, even though not mentioned herein, may be well understood from the following description.

According to an embodiment of the present invention, a location estimating method implemented by a user device may include steps of measuring received signal strength of a signal received from two or more access point (AP) devices deployed within a specific range; establishing a binding box for each of the two or more AP devices by using the measured received signal strength; and estimating a current location of the user device by using points of contact between the established binding boxes.

The method may further include step of after the step of measuring the received signal strength, selecting at least one of the two or more AP devices in view of the received signal strength greater than a predetermined value.

In the method, the step of establishing the binding box may include steps of identifying a location of the AP device; and establishing the binding box having the identified location as a center and also having a radius inversely proportional to the measured signal strength.

In the method, the current location of the user device may be estimated from a central point of a region formed by the points of contact between the established binding boxes.

The method may further include steps of determining whether the user device enters a building; if it is determined that the user device enters the building, establishing an initial altitude value as a reference point for location estimation; establishing inter-floor information; and computing a user-located floor by using a current altitude value, the reference point, and the inter-floor information.

In the method, the inter-floor information may be established using information about an average inter-floor height of the building or using past information about an altitude distribution for each floor of the building.

In the method, if the inter-floor information is established using the past information about an altitude distribution for each floor, the step of establishing the inter-floor information includes steps of obtaining identification information about the building; finding the past information about an altitude distribution for each floor, the past information being previously stored corresponding to the obtained identification information; and establishing the inter-floor information by using the found past information.

In the method, the step of computing the user-located floor may include steps of measuring the current altitude value; obtaining a height by subtracting the altitude value of the reference point from the measured current altitude value; and computing the user-located floor by using the obtained height and the inter-floor information.

In the method, the step of computing the user-located floor may include steps of measuring a current altitude value; finding past information about an altitude distribution for each floor, the past information being previously stored corresponding to the measured current altitude value; and computing the user-located floor by using the found past information.

According to an embodiment of the present invention, a user device may include a signal receiving module configured to receive a signal from two or more access point (AP)

devices deployed within a specific range; a signal strength measuring module configured to measure received signal strength of the signal received by the signal receiving module; a binding box processing module configured to establish a binding box for each of the two or more AP devices by using the received signal strength measured by the signal strength measuring module; and a location determining module configured to estimate a current location of the user device by using points of contact between the binding boxes established by the binding box processing module.

The user device may further include a filtering module configured to select at least one of the two or more AP devices in view of the received signal strength greater than a predetermined value.

In the user device, the binding box processing module may be further configured to establish the binding box by using the received signal strength of the signal received from the at least one AP device selected by the filtering module.

In the user device, the binding box processing module may be further configured to identify a location of the AP device, and to establish the binding box having the identified location as a center and also having a radius inversely proportional to the measured signal strength.

In the user device, the location determining module may be further configured to estimate the current location of the user device from a central point of a region formed by the points of contact between the established binding boxes.

The user device may further include a service device interworking module configured to transmit, to a service device, identification information of the AP devices and the measured received signal strength, and to receive, from the service device, current location information estimated by the service device.

The user device may further include a sensing information collecting module configured to collect sensing information required for determining whether the user device enters a building, and to collect information about an altitude value; a reference point setting module configured to, if it is determined that the user device enters the building, establish a reference point for location estimation; an inter-floor information setting module configured to establish inter-floor information; and a user-located floor computing module configured to compute a user-located floor by using a current altitude value, the reference point, and the inter-floor information.

In the user device, the inter-floor information setting module may be further configured to establish the inter-floor information by using information about an average inter-floor height of the building or by using past information about an altitude distribution for each floor of the building.

In the user device, the user-located floor computing module may be further configured to measure the current altitude value, to obtain a height by subtracting an altitude value of the reference point from the measured current altitude value, and to compute the user-located floor by using the obtained height and the inter-floor information.

According to an embodiment of the present invention, a system may include a user device configured to receive a signal from two or more access point (AP) devices deployed within a specific range, to measure received signal strength of the received signal, and to transmit the measured received signal strength and identification information of the AP devices to a service device; and the service device configured to receive the received signal strength and the identification information of the AP devices from the user device, to establish a binding box for each of the AP devices by using the received signal strength, and to estimate a current location of the user device by using points of contact between the established binding boxes.

In the system, the user device may be further configured to determine whether the user device enters a building, to, if it is determined that the user device enters the building, establish a reference point for location estimation, to establish inter-floor information, and to compute a user-located floor by using a current altitude value, the reference point, and the inter-floor information.

According to the method, device and system for location estimation in this invention, by establishing the binding box of the AP device to have a radius inversely proportional to the received signal strength of a signal received from the AP device at the user device, and then estimating the location of the user device from a central point of a specific region formed by the points of contact between the established binding boxes, the location estimation can be performed simply and efficiently without any complicated mathematical computation.

Additionally, according to this invention, by using only selected AP devices satisfying a predetermined condition to estimate the location of the user device rather than using all AP devices, the location estimation can be performed exactly and efficiently.

Additionally, according to this invention, the location estimation is possible even in case there is insufficient information.

Additionally, according to this invention, the estimation of an indoor location is possible rapidly and exactly by setting or identifying inter-floor information of the building.

Other various advantages and effects will be disclosed explicitly or implicitly in embodiments of this invention to be described below in detail.

DETAILED DESCRIPTION

Figure 1:
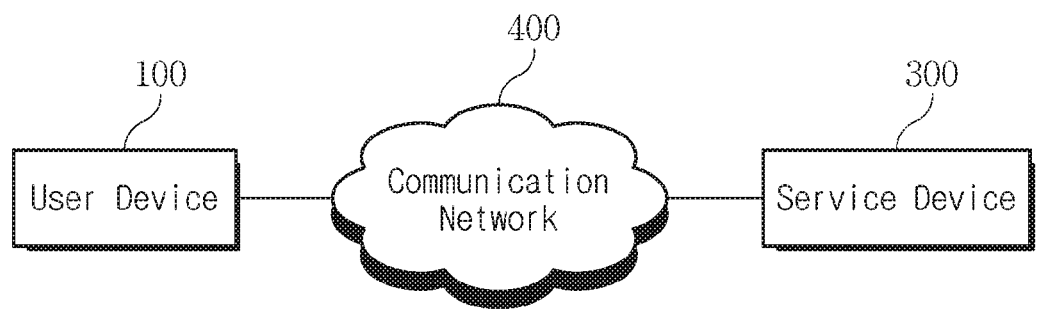
FIG. 1 is a diagram illustrating a system for location estimation according to embodiments of the present invention.

Now, embodiments of the present invention will be described with reference to the accompanying drawings.

In the following description and the accompanying drawings, however, well known techniques may not be described or illustrated in detail to avoid obscuring the subject matter of the present invention. Through the drawings, the same or similar reference numerals denote corresponding features consistently.

The terms and words used in the following description, drawings and claims are not limited to the bibliographical meanings and are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

The expression "1", "2", "first", or "second" used in various embodiments of this disclosure may modify various elements of such embodiments but does not limit the corresponding elements. The above expressions do not limit the sequence and/or importance of the elements but may be used for distinguishing one element from other elements. For example, a first device and a second device indicate different devices although both of them are devices. Meanwhile, without departing from the scope of the present disclosure, a first structural element may be referred to as a second structural element. Similarly, the second structural element also may be referred to as the first structural element.

When it is stated that a certain element is "coupled to" or "connected to" another element, the element may be directly coupled or connected to another element, or a new element may exist between both elements. In contrast, when it is stated that a certain element is "directly coupled to" or "directly connected to" another element, a new element does not exist between both elements.

The terms used in describing various embodiments of this disclosure are only examples for describing a specific embodiment but do not limit such embodiments. Singular forms are intended to include plural forms unless the context clearly indicates otherwise. Unless defined differently, all terms used herein, which include technical terminologies or scientific terminologies, have the same meaning as that understood by a person skilled in the art to which the present disclosure belongs. The terms "include", "comprise" and "have" as well as derivatives thereof, mean inclusion without limitation.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links (of possibly different speeds) that enable the transport of electronic data between computer systems and/or modules (e.g., hardware and/or software modules). When information is transferred or provided over a network or another communications connection (either hardwired, wireless, or a combination of hardwired or wireless) to a computer system, the connection is properly viewed as a computer-readable medium. Computer-executable instructions include, for example, instructions and data which cause a general-purpose computer system or special-purpose computer system to perform a certain function or group of functions. The computer executable instructions may be, for example, binaries, intermediate format instructions such as assembly language, or even source code.

Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

Now, a method, device and system for location estimation according to various embodiments of the present invention will be described with reference to the accompanying drawings.

At the outset, a system for location estimation will be described in detail with reference to FIG. 1.

FIG. 1 is a diagram illustrating a system for location estimation according to embodiments of the present invention.

Referring to FIG. 1, a location estimating method according to embodiments of this invention may be performed through interworking between a user device 100 (also referred to as a terminal, a terminal device, a subscriber device, etc.) and a service device 300. Namely, the user device 100 and the service device 300 may operate as a coordinated system for location estimation.

Specifically, the user device 100 refers to a device capable of transmitting or receiving various kinds of data via a communication network 400 according to user's manipulations. The user device 100 may perform voice or data communication through the communication network 400 and transmit or receive various kinds of information to or from the service device 300. For this, the user device 100 may have a memory for storing a browser, program and protocol for transmission and/or reception of information, a microprocessor for executing and controlling programs, and other elements required inherently or optionally.

Figure 3:
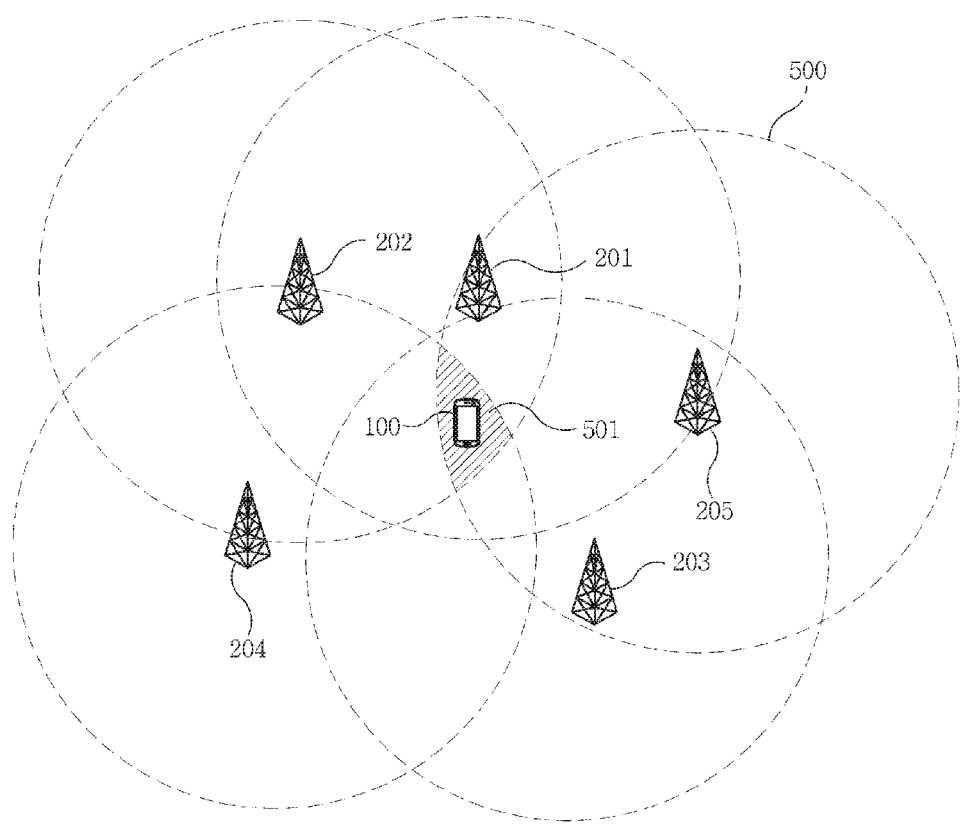
FIGS. 3 to 5 are diagrams illustrating operations of a user device according to an embodiment of the present invention.

Particularly, the user device 100 may be connected to the service device 300 through the communication network 400 by accessing a plurality of access point (AP) devices (e.g., 201, 202, 203, 204 and 205 as shown in FIG. 3) deployed in the communication network 400, thus sending a request for various kinds of information to the service device 300 and receiving such information from the service device 300. Additionally, the user device 100 may measure received signal strength of a signal received from each AP device located within a specific range, transmit information about the measured received signal strength to the service device 300, and receive information about an estimated current location from the service device 300. Additionally or alternatively, the user device 100 may receive information about the locations of AP devices from the service device 300 and directly estimate a current location by using the received information.

Also, the user device 100 may transmit information associated with an estimated current location, e.g., information about a currently located floor, to the service device 300 through the communication network 400 and then receive various services associated with the current location from the service device 300.

The user device 100 may be implemented in various forms. For example, the user device 100 disclosed herein may be a mobile device such as a smart phone, a tablet personal computer (tablet PC), a personal digital assistant (PDA), a portable multimedia player (PMP), an MP3 player, and the like, or a stationary device such as a smart TV, a desktop computer, and the like.

Additionally, the user device 100 may be also referred to as a non-AP device, a wireless transmit/receive unit (WTRU), a user equipment (UE), a mobile station (MS), a mobile terminal, a mobile subscriber unit, and the like.

According to a recent trend of convergence in digital devices, a great variety of mobile devices or their equivalences may be used as the user device 100. Further, any device that can transmit and receive information to and from the service device 300 through the communication network 400 may be used as the user device 100 in embodiments of this invention.

Meanwhile, the service device 300 refers to a device for supporting a location estimating method according to embodiments of this invention. Particularly, the service device 300 may offer information about locations of the AP devices (e.g., 201, 202, 203, 204 and 205 as shown in FIG. 3) to the user device 100 in response to a request of the user device 100, based on identification information of the AP devices received from the user device 100. Also, when signal strength information as well as identification information of the AP devices is received together from the user device 100, the service device 300 may estimate, based on the received information, a current location of the user device 100 and then offer information about the estimated location to the user device 100.

Additionally, the service device 300 may offer various services associated with a user location to the user device 100, such as a weather service suitable for a current location, a targeted advertisement service, and the like. For this, the service device 300 may interwork with content providing servers (not shown) designed to provide such services.

Further, if it is ascertained that the user device 100 is located on a specific floor (e.g., the third floor) in a building, the service device 300 may check security information assigned to the specific floor and, based on the security information, deactivate all or parts of functions of the user device 100. Also, if it is ascertained that the user device 100 moves upward to the next floor (e.g., the fourth floor), the service device 300 may offer notices associated with the next floor in the form of a popup message or the like.

Like this, the service device 300 may identify the location of the user device 100 and offer various types of related information.

In order to perform the above task, the service device 300 may collect, from the user device 100, various kinds of information required for estimating the location of the user device 100. Using this, the service device 300 may establish a reference point for location estimation and also establish inter-floor information. Further, using current altitude information, the reference point and the inter-floor information, the service device 300 may compute a user-located floor and then offer various location-based services corresponding to the user-located floor. Additionally or alternatively, the service device 300 may receive location information estimated by the user device 100 and perform corresponding operations.

Elements and operations of each of the user device 100 and the service device 300 will be described in detail below. Meanwhile, a processor embedded in each device according embodiments of this invention may process a program command for executing the method of this invention. This processor may be a single-threaded processor or a multi-threaded processor. Also, this processor may process commands stored in a memory or any other storage.

The user device 100 and the service device 300 transmit and receive various kinds of information to and from each other through the communication network 400. The communication network 400 may use wireless communication technique such as, but not limited to, WLAN (Wireless Local Access Network), Wi-Fi, Wibro, Wimax, HSDPA (High Speed Downlink Packet Access), or the like. Alternatively or additionally, depending on system types, the communication network 400 may use wired communication technique such as Ethernet, xDSL (ADSL, VDSL), HFC (Hybrid Fiber Coaxial cable), FTTC (Fiber To The Curb), FTTH (Fiber To The Home), or the like.

Additionally, the communication network 400 includes a plurality of access networks (not shown) and a core network (not shown), and may further include an external network, e.g., Internet (not shown). Here, the access network is to perform wired/wireless communication with the user device 100 and may be formed of a plurality of base stations, also referred to as BTS (Base Transceiver Station), NodeB, or eNB (eNodeB or evolved Node B), and controllers such as BSC (Base Station Controller) and RNC (Radio Network Controller). Additionally, instead of such a base station that includes a digital signal processor and a radio signal processor, a plurality of radio units (not shown) corresponding to the radio signal processor may be disposed respectively at a plurality of regions and connected to a centralized digital unit (not shown) corresponding to the digital signal processor.

The core network which forms a mobile network together with the access network performs a function to connect the access network and the external network such as Internet.

The core network is a network system that performs main functions for a mobile communication service such as mobility control and switching between the access networks. Namely, the core network performs circuit switching or packet switching and further manages and controls a packet flow in the mobile network. In addition, the core network may manage mobility between frequencies, control traffic therein and in the access network, and control interworking with other network such as Internet. The core network may be formed of SGW (Serving GateWay), PGW (PDN Gateway), MSC (Mobile Switching Center), HLR (Home Location Register), MME (Mobile Mobility Entity), HSS (Home Subscriber Server), and/or the like.

The Internet is a world common network through which information is exchanged according to TCP/IP protocol. The Internet is connected to the service device 300 and may deliver information, offered from the service device 300, to the user device 100 through the core network and the access network. Similarly, the Internet may deliver information, offered from the user device 100, to the service device 300 through the core network and the access network.

Hereinafter, elements and operations of the user device 100 according to embodiments of this invention will be described.

Figure 2:
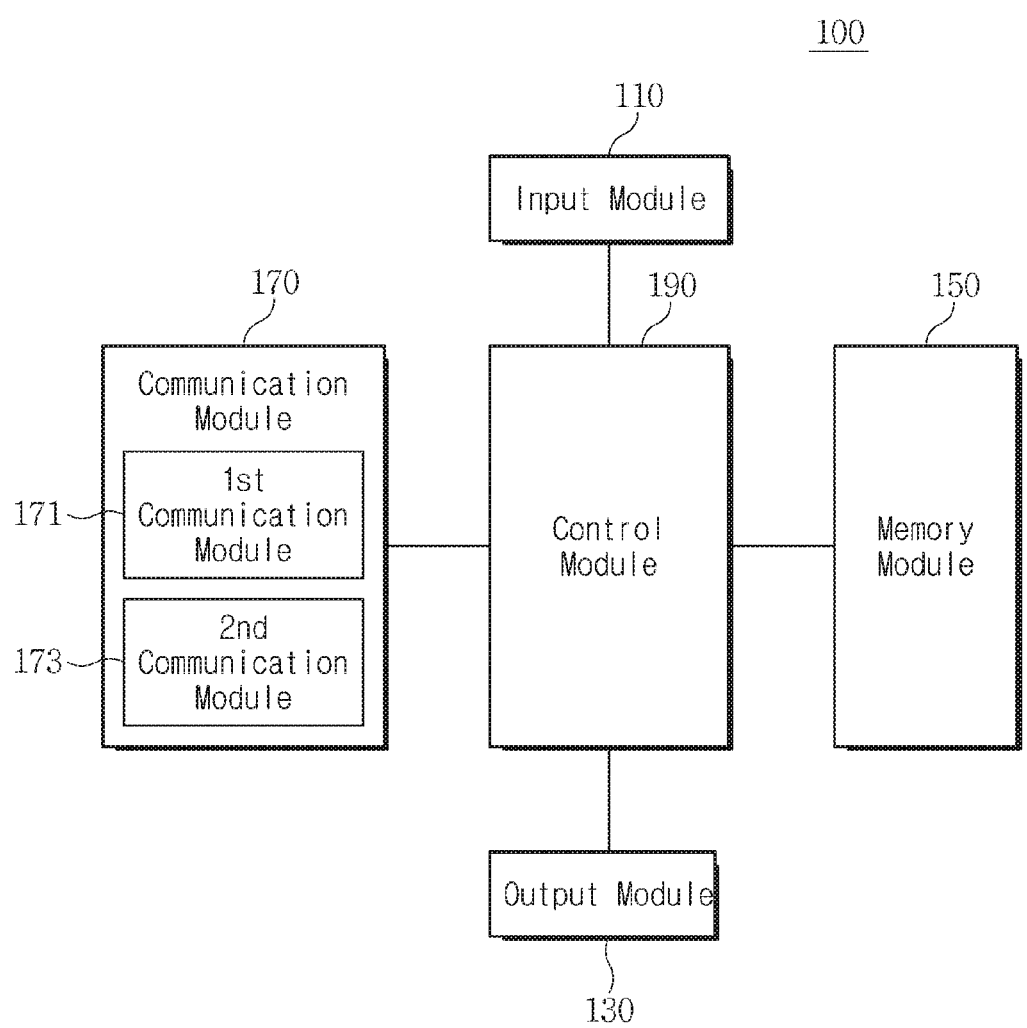
FIG. 2 is a block diagram illustrating a user device shown in FIG. 1 according to embodiments of the present invention.
Figure 4:
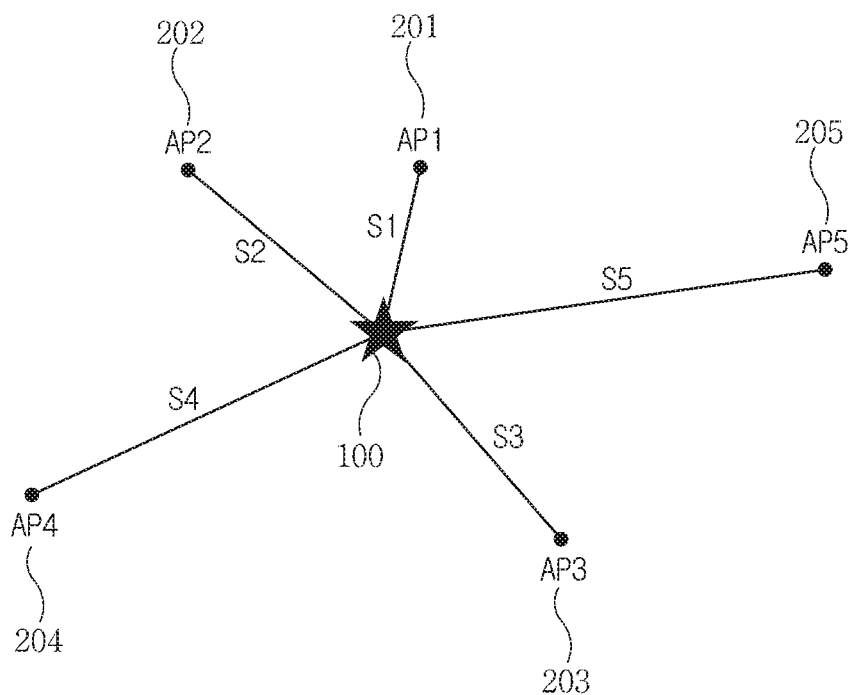
Figure 5:
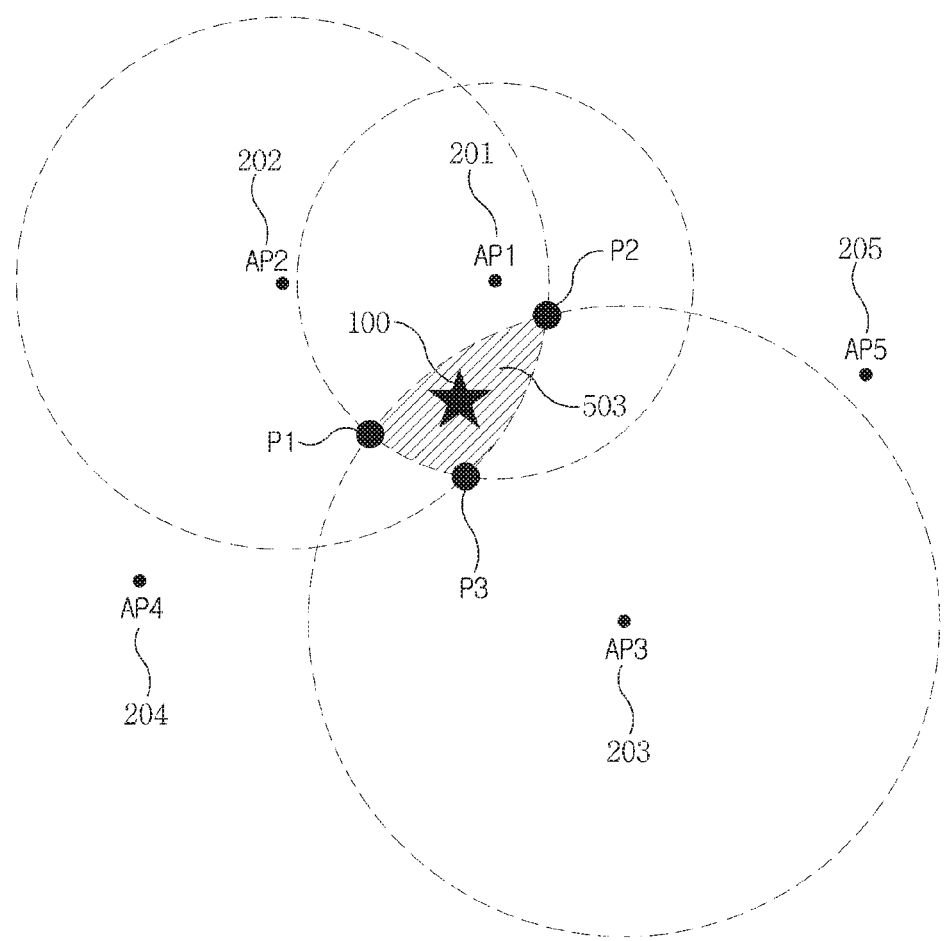
Figure 6:
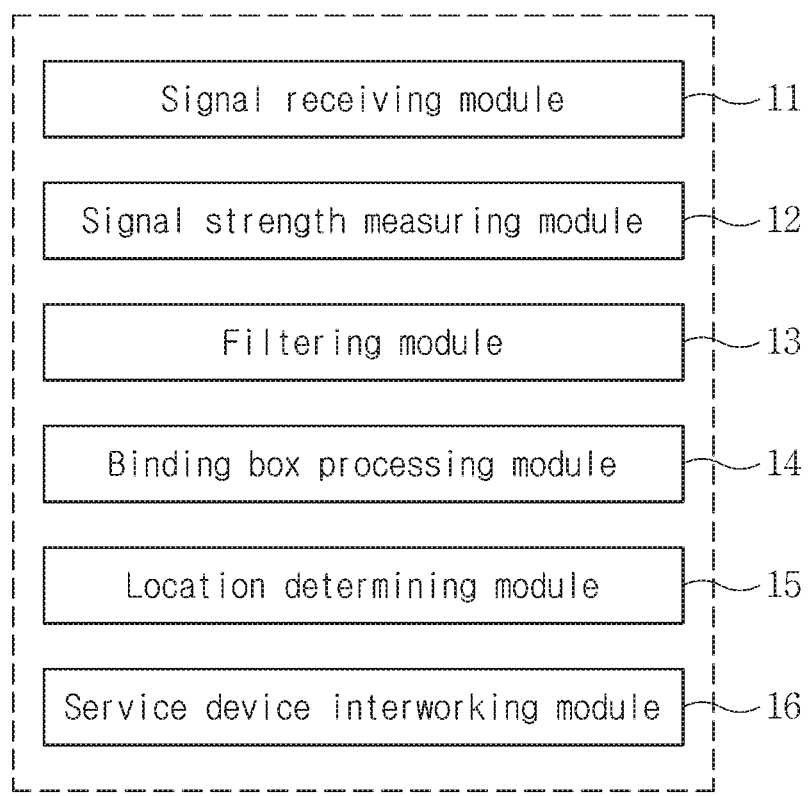
FIG. 6 is a block diagram illustrating functional elements of a user device according to an embodiment of the present invention.
Figure 7:
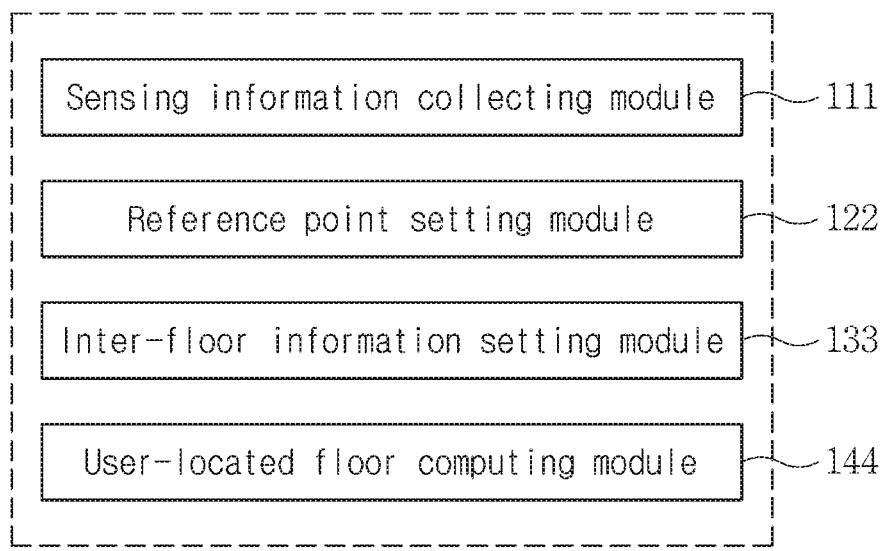
FIG. 7 is a block diagram illustrating functional elements of a user device according to another embodiment of the present invention.

FIG. 2 is a block diagram illustrating a user device shown in FIG. 1 according to embodiments of the present invention. FIGS. 3 to 5 are diagrams illustrating operations of a user device according to an embodiment of the present invention. FIG. 6 is a block diagram illustrating functional elements of a user device according to an embodiment of the present invention. FIG. 7 is a block diagram illustrating functional elements of a user device according to another embodiment of the present invention.

At the outset, referring to FIG. 2, the user device 100 may include an input module 110, an output module 130, a memory module 150, a communication module 170, and a control module 190.

In this disclosure, the term "module" may refer to a component or device which is formed of software, hardware, or combination thereof, and performs certain tasks. A module may be configured to reside on an addressable storage medium and configured to execute on one or more processors. The functionality provided for in the components and modules may be combined into fewer components and modules or further separated into additional components and modules.

The input module 110 is configured to receive user's manipulation for entering various kinds of information and setting or controlling various functions of the user device 100, to create a corresponding input signal, and to deliver the input signal to the control module 190. The input module 110 may include a keypad and/or a touch pad. The input module 110 formed of a touch panel may be integrated with the output module 130 formed of a display panel to constitute a touch screen. The input module 110 may use various input mechanisms such as a keyboard, a mouse, a joystick, a jog wheel, a touch-sensitive unit, a gesture or image detection unit, a voice recognition unit, and the like. Particularly, the input module 110 detects input information entered by the user and delivers it to the control module 190.

The output module 130 is configured to display information about the state and result of operations generated during the execution of functions of the user device 100. Also, the output module 130 may display a menu of the user device 100 and user data entered by the user. The output module 130 may be formed of LCD (Liquid Crystal Display), TFT-LCD (Thin Film Transistor LCD), LED (Light Emitting Diode), OLED (Organic LED), AMOLED (Active Matrix OLED), retina display, flexible display, 3-dimensional display, or the like. In case the output module 130 is formed of a touch screen, the output module 130 may perform the whole or parts of functions of the input module 110.

Particularly, the user device 100 according to embodiments of this invention may offer information associated with a user location through the output module 130.

The memory module 150 is a device for storing data and includes a main memory unit and an auxiliary memory unit. Further, the memory module 150 stores a program required for the operation of the user device 100. The memory module 150 may include mainly a program region and a data region. When any function is activated in response to a user's request, the user device 100 executes a relevant application and offers a particular function under the control of the control module 190.

The communication module 170 is configured to send or receive information to or from the service device 300 through the communication network 400. Additionally, the communication module 170 receives a variety of signals emitted within a specific range from the user device 100.

The communication module 170 may include an RF transmitter which up-converts the frequency of an outgoing signal and then amplifies the signal, an RF receiver which amplifies with low-noise an incoming signal and down-converts the frequency of the signal, a data processor for processing a communication protocol based on a specific communication scheme, and the like. The communication module 170 may include at least one wireless communication module (not shown) and/or at least one wired communication module (not shown). The wireless communication module may be configured for transmission and reception based on a particular wireless communication scheme. In case of using wireless communication, the user device 100 may transmit or receive data to or from the service device 300 by using one of a wireless network communication module, a WLAN communication module, and a WPAN communication module.

Particularly, the communication module 170 includes the first communication module 171 and the second communication module 173.

The first communication module 171 receives signals emitted from AP devices deployed within a specific range from the user device 100 and/or beacon signals emitted from beacon devices. The first communication module 171 may perform PAN-type communication including Bluetooth.

The second communication module 173 communicates with the service device 300 through the communication network 400. The second communication module 173 may use wireless communication technique such as, but not limited to, WLAN (Wireless Local Access Network), Wi-Fi, Wibro, Wimax, HSDPA (High Speed Downlink Packet Access), or the like.

The control module 190 may be a processor for triggering and operating each element and an operation system of the user device 100.

Specifically, the control module 190 may receive an input signal through the input module 110 and then control the communication module 170 to transmit the received input signal to the service device 300. Also, the control module 190 may receive information or data from the service device 300 and then control the output module 150 to store the received information or data.

Particularly, the control module 190 controls the whole operations of the user device 100 in connection with embodiments of this invention. For example, in an embodiment, the control module 190 may receive a signal emitted within a specific range of the user device 100, establish a binding box having a radius being inversely proportional to signal strength of the received signal, and estimate the location of the user device 100 from a central point of a region formed by points of contact between the binding boxes.

Additionally, in another embodiment, the control module 190 may determine whether a user of the user device 100 enters a building. If it is determined that the user enters the building, the control module 190 may perform subsequent operations to be discussed below.

Hereinafter, a location estimating method according to an embodiment of this invention will be described in detail with reference to FIGS. 3 to 6. Referring to FIG. 3, the user device 100 may receive signals emitted respectively from AP device 201, 202, 203, 204 and 205 and then perform a network access procedure or any other predetermined operation.

In this disclosure, a plurality of, i.e., two or more, AP devices may be often indicated using reference numerals 201 to 205 without being specified individually. Also, each of the respective AP devices may be indicated individually such as AP1 201, AP2 202, and the like.

In the environment where such AP devices 201 to 205 are deployed, the user device 100 may search for accessible AP devices and be connected to a network through any found AP device.

In this case, the user device 100 may be an electronic device that complies with the Wireless LAN Medium Access Control (MAC) and Physical Layer (PHY) Specifications of IEEE 802.11 standard. This user device 100 may be located within access coverage supported by one or more AP devices 201 to 205. Then the user device 100 may find one or more AP devices 201 to 205 capable of supporting the access coverage, and be connected to one of the found AP devices 201 to 205 so as to access a communication network.

Each of the AP devices 201 to 205 is a kind of signal transfer point that supports a network access of the user device 100. Each AP device has the particular access coverage indicating a certain geographical range for its service and supports a communication service from any external entity with regard to the user device 100 located within the access coverage.

Specifically, the AP device supports a connection between the user device 100 and an upper node, e.g., gateway (not shown) and a node in a core network (not shown), via a predefined radio medium in the access coverage. Namely, the AP device detects a signal emitted from a WLAN module of the user device 100 entering into the access coverage thereof, delivers the detected signal to the core network, and thereby supports a network access of the user device 100.

Additionally, the AP devices 201 to 205 may be connected to the core network in a wired communication manner. Specifically, the AP device may be connected to an upper node such as a gateway, a base station controller (BSC), a radio network controller (RNC), or the like. A section that supports access to the core network which is a backbone network is referred to as a backhaul, which may be connected in a wired communication manner.

For example, the AP device may be connected to the core network through S1 interface. If the core network is implemented as LTE system, the AP device may be connected to an evolved packet core (EPC) in the core network, especially, to a mobility management entity (MME) via S1-MME and to a serving gateway (SGW) via S1-U. Also, using at least one interface of Ethernet, ATM, IP, PPP, Frame Relay, and a digital subscriber line (DSL) such as HDSL, ADSL or xDSL, the AP device may be connected to the core network.

The AP device may be also referred to as a central controller, a base station (BS), a node-B, a base transceiver system (BTS), a site controller, or the like.

FIG. 4 is an example view for illustrating a location estimating method in an embodiment of this invention. Let's suppose that five AP devices, AP1 201, AP2 202, AP3 203, AP4 204 and AP5 205, are deployed around the user device 100 and that the user device 100 can receive a signal from each AP device.

Normally a signal received from the AP device by the user device 100 is inversely proportional to a distance between the AP device and the user device 100. For example, if distances from the user device 100 to the respective AP devices are AP1<AP2<AP3<AP4<AP5, the strength of signals received by the user device 100 may be S1>S2>S3>S4>S5.

In this situation, the user device 100 measures the received signal strength of a signal received from each neighboring AP device and then establishes a circular binding box having a center at the location of each AP and having a radius being inversely proportional to the measured received signal strength. The ratio of radius to received signal strength may be determined statistically from a relation between a distance and received signal strength. Further, when receiving signals from two or more AP devices and then forming the binding box based on received signal strength, the use device 100 may perform a filtering process of selecting specific AP devices corresponding to the received signal strength greater than a predetermined value in order to enhance the accuracy of location estimation.

Namely, as shown in FIG. 5, only AP1 201, AP2 202 and AP3 203 may be selected from among the AP devices 201 to 205 in view of the received signal strength greater than a predetermined value. In this case, the binding box is formed to have a radius being inversely proportional to the received signal strength at each of the selected AP devices 201, 202 and 203. Then points of contact P1, P2 and P3 are extracted from points where boundaries of the binding boxes intersect, and the location of the user device 100 is determined as a central point of a region formed by the points of contact P1, P2 and P3. In other words, the user device 100 may be estimated to be located within a common region shared by the binding boxes.

The location estimation may be performed by the user device 100 or the service device 300. In the former case, the user device 100 may measure the received signal strength of signals received from respective AP devices as discussed above, send a request for information about locations of the AP devices to the service device 300, and estimate the location of the user device 100 based on information received from the service device 300. In the latter case, the user device 100 may transmit information about the received signal strength for each AP device to the service device 300 and then receive a result of location estimation from the service device 300.

The above-discussed process allows a simple, easy and efficient estimation for a current location of the user device without any complicated mathematical computation.

In view of functionality, the user device 100 according to an embodiment of this invention may include the following elements.

Referring to FIG. 6, the user device 100 may include a signal receiving module 11, a signal strength measuring module 12, a filtering module 13, a binding box processing module 14, a location determining module 15, and a service device interworking module 16.

Specifically, the signal receiving module 11 may perform a procedure of establishing a frequency band and then scanning a supportable channel in the frequency band. For example, the signal receiving module 11 may establish a frequency band of 2.4 GHz and then scan a supportable channel one by one from the lowermost channel to the uppermost channel in the established frequency band.

Also, the signal receiving module 11 may perform a search procedure of finding AP devices 201 to 205 and receiving a signal (e.g., a beacon signal) from the found AP device(s).

In particular, the signal receiving module 11 may perform a procedure of finding AP devices 201 to 205 through each channel and then scanning a signal received from the found AP device(s). This scanning procedure may include a passive scanning procedure and an active scanning procedure.

The passive scanning procedure allows the signal receiving module 11 to wait for a beacon signal emitted from the AP device(s) while sequentially listening at respective channels, and to obtain information, e.g., identification information, about the AP devices 201 to 205 from a beacon message.

The active scanning procedure allows the user device 100 to send a probe request message to each channel and then detect a channel activity for the minimum channel time at that channel. If there is no response from a certain channel for the minimum channel time, the signal receiving module 11 scans the next channel. If any activity of a certain channel is detected for the minimum channel time, the signal receiving module 11 waits for a probe response message until the maximum channel time, processes the probe response message received from AP device(s) for the maximum channel time, and then scans the next channel.

The signal strength measuring module 12 performs a function to measure the received signal strength of a signal received through the signal receiving module 11. Namely, the signal strength measuring module 12 measures the received signal strength, e.g., the received signal strength indication (RSSI), of a beacon signal emitted from the AP device identified through the signal receiving module 11.

The filtering module 13 performs a filtering function to select the AP devices in view of the received signal strength greater than a predetermined value so as to enhance the accuracy of location estimation. Particularly, the filtering module 13 may select two or more, preferably three, AP devices by adjusting the predetermined value for received signal strength. Of course, the predetermined value for receives signal strength may be varied according to user's setting or system setting.

The binding box processing module 14 performs a function to establish a binding box by using the received signal strength measured through the signal strength measuring module 12. Particularly, the binding box processing module 14 may establish a circular binding box of each AP device so as to be inversely proportional to the measured signal strength. Therefore, the AP device corresponding to relatively greater received signal strength may have a circular binding box having a relatively smaller radius, and the AP device corresponding to relatively smaller received signal strength may have a circular binding box having a relatively greater radius.

The location determining module 15 performs a function to determine a current location of the user device 100, based on collected information. Particularly, the location determining module 15 may request the location estimation from the service device 300 by sending both identification information about the AP devices 201 to 205 and the measured signal strength to the service device 300 through the service device interworking module 16. Then the location determining module 15 may receive a response to the request for location estimation from the service device 300. Alternatively, the location determining module 15 may send only identification information about the AP devices 201 to 205 to the service device 300 through the service device interworking module 16, receive location information about the respective AP devices 201 to 205 from the service device 300, and then estimate a current location of the user device 100 by using the received location information.

In case of directly estimating the location of the user device 100, the location determining module 15 establishes binding boxes of the AP devices 201 to 205 in view of the received signal strength and then extracts points of contact P1, P2 and P3 from points where boundaries of the binding boxes intersect. Also, the location determining module 15 identifies a geographical region formed by the points of contact P1, P2 and P3 and then determines a central point of the identified region as the location of the user device 100.

The service device interworking module 16 performs a function to interwork with the service device 300 and support transmission and reception of information. Particularly, the service device interworking module 16 may perform a process of selecting, based on the signal strength, an optimal AP device from among the AP devices identified through the signal receiving module 11 and the signal strength measuring module 12 and also perform a process of connecting with the selected AP device.

Also, the service device interworking module 16 may transmit identification information about the AP devices 201 to 205 to the service device 300 through the connected AP device and then receive location information about the AP devices 201 to 205. Alternatively, the service device interworking module 16 may transmit both identification information and received signal strength information about the AP devices 201 to 205 to the service device 300 and then receive estimated location information of the user device 100.

Heretofore, functional elements of the user device 100 according to an embodiment of this invention are described.

Meanwhile, in another embodiment of this invention, the user device 100 may determine whether a user enters a building, and if so, estimate a user's indoor location.

This will be described hereinafter with reference to FIG. 7.

FIG. 7 is a block diagram illustrating functional elements of a user device according to another embodiment of the present invention.

Referring to FIG. 7, the user device 100 according to another embodiment of this invention may further include a sensing information collecting module 111, a reference point setting module 122, an inter-floor information setting module 133, and a user-located floor computing module 144. Namely, in addition to the aforesaid modules shown in FIG. 6, the user device 100 according to another embodiment may further include some modules required for estimating a user's indoor location.

Specifically, the sensing information collecting module 111 performs a function to collect necessary information by using various kinds of hardware sensor resources. For example, the sensing information collecting module 111 may have an illumination sensor and collect information about variations in light intensity around the user through the illumination sensor. Also, the sensing information collecting module 111 may include a microphone and collect information about surrounding noise.

In addition, the sensing information collecting module 111 may collect information about beacon signals by using a radio communication unit, and collect information about variations in temperature by using a temperature sensor. In particular, the sensing information collecting module 111 may include an altitude sensor and collect an altitude value of a current height.

Sensing information collected by the sensing information collecting module 111 is not limited to the above examples, and any other information required for embodiments of this invention may be further sensed and collected.

The reference point setting module 122 performs a function to establish a reference point for the location estimation of this invention. At the outset, using the information collected by the sensing information collecting module 111, the reference point setting module 122 may determine that a user enters a building.

For example, if information about date and time collected by the sensing information collecting module 111 indicates summer and daytime, and if temperature information collected by the sensing information collecting module 111 indicates a variation of temperature from a high temperature to a low temperature, the reference point setting module 122 may determine that a user moves into a building from the outside. In another example, if the current time collected by the sensing information collecting module 111 indicates midday, and if an illumination value measured through the illumination sensor indicates a variation of illumination from a bright state to a dark state, the reference point setting module 122 may determine that a user moves into a building from the outside. In still another example, if the user device 100 sends a beacon signal to the service device 300 and then receives location information corresponding to the beacon signal, and if this beacon signal is sensed through the sensing information collecting module 111, the reference point setting module 122 may determine that a user moves into a building from the outside. Like these examples, the reference point setting module 122 may have various conditions to be used for determining whether a user moves to an indoor position from the outside. Depending on hardware resources in the user device 100, such conditions may be varied.

Additionally, at least one kind of sensing information, if necessary, any combination of some kinds of sensing information, may be collected and used for determining a movement to an indoor position from the outside.

When it is determined that a user enters a building, the reference point setting module 122 requests the sensing information collecting module 111 to measure an altitude value, and then sets the measured altitude value as a reference point. For example, the reference point may be the first floor of a building.

The inter-floor information setting module 133 performs a function to establish inter-floor information indicating a height between adjacent floors. Herein, the inter-floor information may refer to information about an average height between adjacent floors or information about an altitude distribution of each floor. The inter-floor information may be established using an average inter-floor height calculated statistically. For example, if an average inter-floor height of buildings built during the past five years is 2.7 m, the inter-floor information setting module 133 may check attribute information (e.g., a construction year) of a building and then, if it is ascertained that the building has been built within the past five years, establish the inter-floor information from the average inter-floor height 2.7 m. Also, the inter-floor information setting module 133 may periodically request the sensing information collecting module 111 to measure an altitude value and then, considering both the measured altitude value and the average inter-floor height, correct or reset the inter-floor information.

Additionally, the sensing information collecting module 111 may create inter-floor information by using altitude distribution information of each floor obtained from past information about an altitude value of each floor. For example, if the same building has past information indicating that altitude values are 5.4 m and 8.1 m at positions estimated as the third and fourth floors, respectively, the inter-floor information setting module 133 may establish inter-floor information by using this past information. Also, the inter-floor information setting module 133 may establish inter-floor information by interworking with the service device 300 and using information measured by any other device at the same building.

The user-located floor computing module 144 performs a function to compute a specific floor where a user is located currently. For this computation, the user-located floor computing module 144 may use the reference point established by the reference point setting module 122, the inter-floor information established by the inter-floor information setting module 133, and the current altitude value collected by the sensing information collecting module 111.

Specifically, the user-located floor computing module 144 requests the sensing information collecting module 111 to measure a current altitude value. This request may be sent to the sensing information collecting module 111 when a given time elapses after a user enters a building, or when a specific event occurs. For example, when a specific event such as a trigger of a particular application occurs after a user enters a building, the user-located floor computing module 144 may send a request for measuring a current altitude value to the sensing information collecting module 111 so as to estimate a current user location.

Then, when the current altitude value is received from the sensing information collecting module 111, the user-located floor computing module 144 subtracts the reference point established by the reference point setting module 122 from the received current altitude value.

Then the user-located floor computing module 144 may compute a user-located floor by dividing the subtraction result by the average inter-floor height. For example, if the current altitude value is 50 m, if the reference point is 5 m, and if the average inter-floor height is 5 m, a height obtained by subtracting the reference point from the current altitude value becomes 45 m, and a final value obtained by dividing this height by the average inter-floor height becomes 9. Therefore, the user-located floor computing module 144 ascertains that a user of the user device 100 is located on the ninth floor.

Additionally, the user-located floor computing module 144 may extract a user-located floor in comparison with altitude distribution information for each floor, namely by using past data. Specifically, the user-located floor computing module 144 checks whether there is past information about computation of user-located floor with regard to the same building. This past information may be stored in the user device 100 or received from the service device 300.

For example, if the current altitude value is 50 m and if there is past floor information corresponding to 50 m, this past floor information may be used for computing a user-located floor. In this case, the user-located floor computing module 144 may set a certain range in view of sensitivity of the sensing information collecting module 111. For example, if the current altitude value is 50 m and if there is past floor information within such a range, e.g., 48 m, rather than 50 m, the user-located floor computing module 144 may use such past floor information as floor information corresponding to the current altitude value.

When a user-located current floor is identified through the above process, the user-located floor computing module 144 may store the identified data to utilize in the location estimation.

Discussed hereinbefore are the location estimation methods performed chiefly at the user terminal 100 according to various embodiments of this invention. These methods are, however, always performed at the user terminal 100. Alternatively or additionally, these methods may be performed chiefly at the service device 300 or through interworking between the user device 100 and the service device 300.

Hereinafter, case of performing the location estimation method at the service device 300 will be described with reference to FIG. 8.

Figure 8:
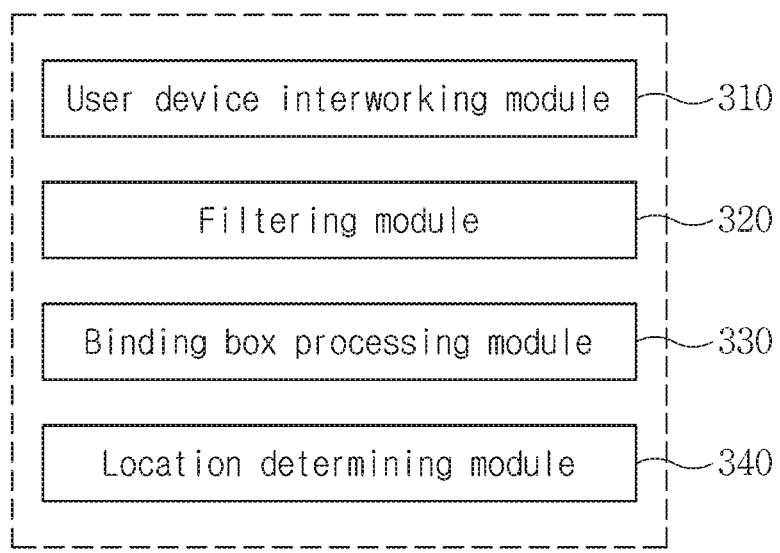
FIG. 8 is a block diagram illustrating a service device shown in FIG. 1 according to embodiments of the present invention.

FIG. 8 is a block diagram illustrating a service device shown in FIG. 1 according to embodiments of the present invention.

Referring to FIGS. 1 and 8, the service device 300 may include a user device interworking module 310, a filtering module 320, a binding box processing module 330, and a location determining module 340.

Specifically, the user device interworking module 310 performs a function to transmit or receive information to or from the user device 100. Particularly, the user device interworking module 310 may receive, from the user device 100, various kinds of information for estimation of the location of the user device 100. Also, the user device interworking module 310 may receive identification information about AP devices found by the user device 100 and then offer location information about the AP devices to the user device 100. And also, the user device interworking module 310 may receive, from the user device 100, received signal strength information of signals received from the AP devices as well as identification information of the AP devices found by the user device 100 and then offer, to the user device 100, location information of the user device 100 estimated by the location determining module 340.

Additionally, the user device interworking module 310 may perform a function to offer information associated with various location-based services to the user device 100, for example, resource scheduling, application preloading, advertisement, etc. depending on the location of the user device 100.

The filtering module 320 performs a filtering function to select the AP devices in view of the received signal strength greater than a predetermined value so as to enhance the accuracy of location estimation. At this time, the received signal strength of the AP devices 201 to 205 is received from the user device 100. The filtering module 320 may select two or more, preferably three, AP devices above a proper strength range and then support the location estimation using the selected AP devices.

The binding box processing module 330 performs a function to establish a binding box by using the received signal strength of the AP devices selected by the filtering module 320. Particularly, the binding box processing module 330 may establish a circular binding box of each AP device so as to be inversely proportional to the measured signal strength with regard to the user device 100. Therefore, the AP device corresponding to relatively greater received signal strength may have a circular binding box having a relatively smaller radius, and the AP device corresponding to relatively smaller received signal strength may have a circular binding box having a relatively greater radius.

The location determining module 340 performs a function to determine a current location of the user device 100, based on collected information. Particularly, if identification information only about the AP devices 201 to 205 is received from the user device 100 through the user device interworking module 310, the location determining module 340 may identify locations of the AP devices 201 to 205 and then offer the identified location information to the user device 100 through the user device interworking module 310.

Additionally, if information about the received signal strength regarding the AP devices 201 to 205 is received together with the identification information about the AP devices 201 to 205 through the user device interworking module 310, the location determining module 340 may establish binding boxes of the AP devices 201 to 205 in view of the received signal strength and then extract points of contact P1, P2 and P3 from points where boundaries of the binding boxes intersect. Also, the location determining module 340 may identify a central point of a region formed by the points of contact P1, P2 and P3 and then determines the identified central point as the location of the user device 100. In this case, the location determining module 340 may estimate the location of the user device 100 by using some AP devices only selected through the filtering module 320.

Also, the location determining module 340 may perform a function to offer information about the determined location of the user device 100 to the user device 100 through the user device interworking module 310. Meanwhile, the location determining module 340 may make a map of a plurality of AP devices, select some AP devices 201 to 205 on the map, based on the received signal strength collected by the user device 100, and establish binding boxes of the selected AP devices so as to estimate the location of the user device 100.

Hereinbefore, functional elements of the service device 300 and operations thereof are described. The above-discussed functional elements of service device 300 are not limited to the modules shown in FIG. 8, and the service device 300 may be alternatively implemented by more or less modules. For example, although not shown, the service device 300 may further have a module for storing and managing information about the user device 100 or performing a function to authenticate the user device 100. Also, the service device 300 may further have a module for storing and managing information about geographical locations of the AP devices and information about the number of user devices connected currently. And also, in order to periodically store and manage information about the AP devices, the service device 300 may have a module for periodically receiving Keep Alive messages from the AP devices and processing the received messages.

Meanwhile, in case of offering location information only of the AP devices to the user device 100, the service device 300 may not include the filtering module 320 and the binding box processing module 330.

Additionally, in case of performing or supporting the above-discussed method for location estimation according to another embodiment, the service device 300 may include the functional modules of the user device 100 as shown in FIG. 7. In this case, a sensing information collecting module included in the service device 300 may request the user device 100 to measure sensing information and then receive the sensing information from the user device 100, or collect sensing information measured by the user device 100.

Further, in case the user device 100 estimates an indoor location thereof as discussed above, the service device 300 may receive, from the user device 100, a request for information about an average inter-floor height, attribute information of a building, or information measured by other device in the building. Then the service device 300 may offer the requested information to the user device 100 such that the user device 100 can estimate the location thereof.

Hereinafter, location estimating methods according to various embodiments of this invention will be described. These methods may be performed mainly at the user device 100 and sometimes performed through interworking between the user device 100 and the service device 300. This is, however, exemplary only and not to be construed as a limitation.

Figure 9:
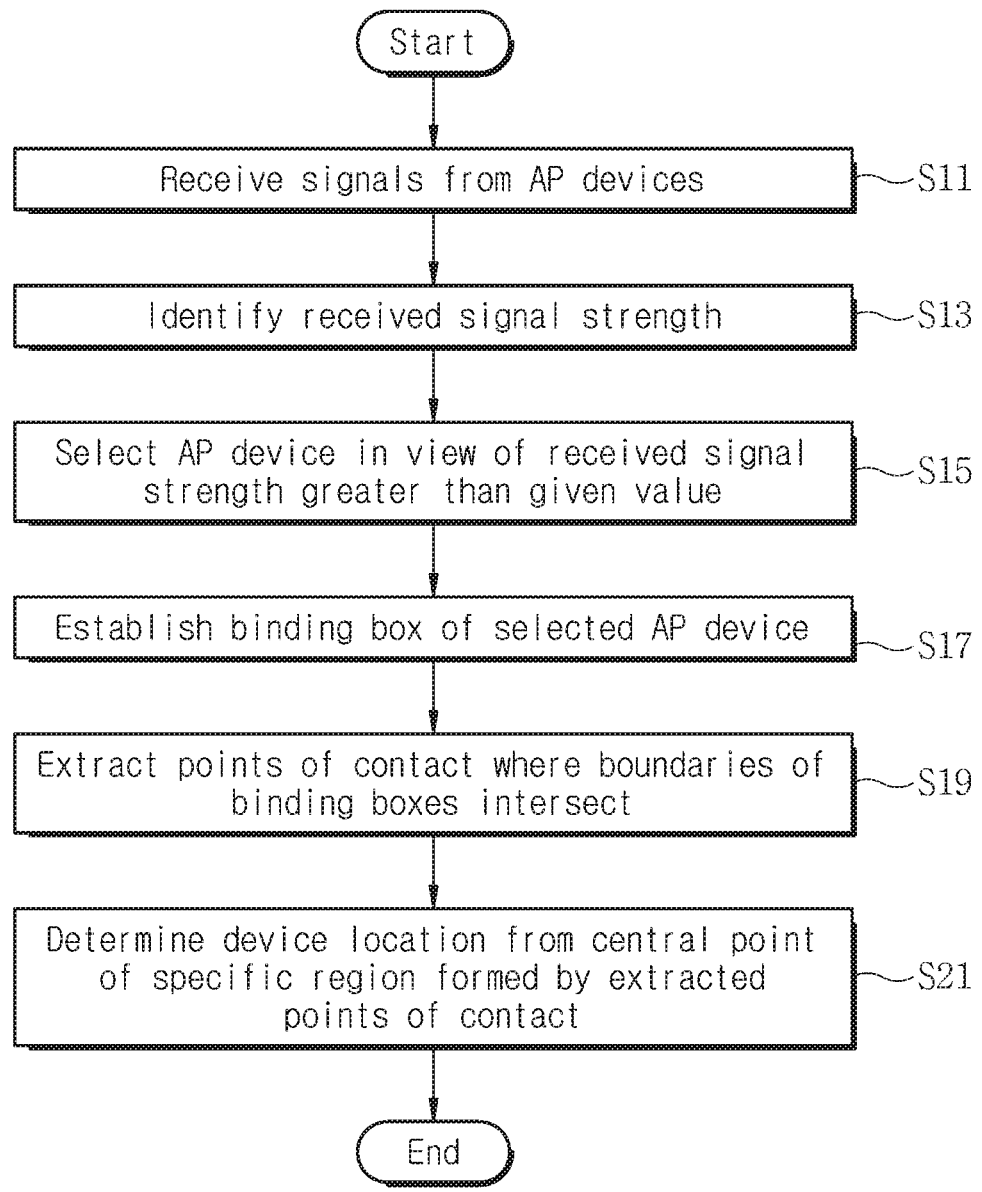
FIG. 9 is a flow diagram illustrating a location estimating method according to an embodiment of the present invention.

FIG. 9 is a flow diagram illustrating a location estimating method according to an embodiment of the present invention.

Let's suppose, as discussed above through FIGS. 4 and 5, that AP1 201, AP2 202, AP3 203, AP4 204 and AP5 205 are deployed around the user device 100 and that the user device 100 can receive a signal from each of AP1 201, AP2 202, AP3 203, AP4 204 and AP5 205.

This signal received by the user device 100 is inversely proportional to a distance between the user device 100 and each of AP1 201, AP2 202, AP3 203, AP4 204 and AP5 205. Namely, if a distance from the user device 100 to each AP device is AP1<AP2<AP3<AP4<AP5, the strength of a signal received by the user device 100 may be S1>S2>S3>S4>S5.

In this situation, the user device 100 searches for neighboring AP devices, AP1 201, AP2 202, AP3 203, AP4 204 and AP5 205 (step S11), and then measures the received signal strength of a signal received from each of AP1 201, AP2 202, AP3 203, AP4 204 and AP5 205 (step S13).

Then, for more exact and simpler estimation of location, the user device 100 performs a filtering process for the found neighboring AP devices (step S15). At this step, the user device 100 may select only AP1 201, AP2 202 and AP3 203 each of which emits a signal having the received signal strength greater than a predetermined value.

Then, at each of the selected AP devices 201, 202 and 203, the user device 100 establishes a circuit binding box having a radius being inversely proportional to the received signal strength (step S17). At this step, the ratio of a radius to received signal strength may be determined using a statistically calculated relation between a distance and signal strength.

Namely, as shown in FIG. 5, only AP1 201, AP2 202 and AP3 203 having the received signal strength greater than a predetermined value may be selected, and the binding box is formed to have a radius being inversely proportional to the received signal strength at each of the selected AP devices 201, 202 and 203.

Then, the user device 100 extracts points of contact P1, P2 and P3 from points where boundaries of the binding boxes intersect (step S19), and determines the location thereof from a central point of a specific region formed by the extracted points of contact P1, P2 and P3 (step S21).

Through this process, the user device 100 can easily and efficiently estimate the current location thereof without any complicated mathematical computation.

Meanwhile, this location estimating method may be performed through interworking with the service device 300.

Specifically, the user device 100 may receive a signal from each of the AP devices, identify the strength of the received signal, send both the identified strength and identification information of each AP device to the service device 300, and receive information about an estimated current location from the service device 300.

Additionally, the user device 100 may receive a signal from each of the AP devices, identify the strength of the received signal, and send, to the service device 300, only identification information of selected AP devices from which signals are received. Then the user device 100 may receive, from the service device 300, information about geographical locations of the AP devices and, based on this information, directly estimate the current location thereof.

Hereinafter, a location estimating method according to another embodiment of this invention will be described.

Figure 10:
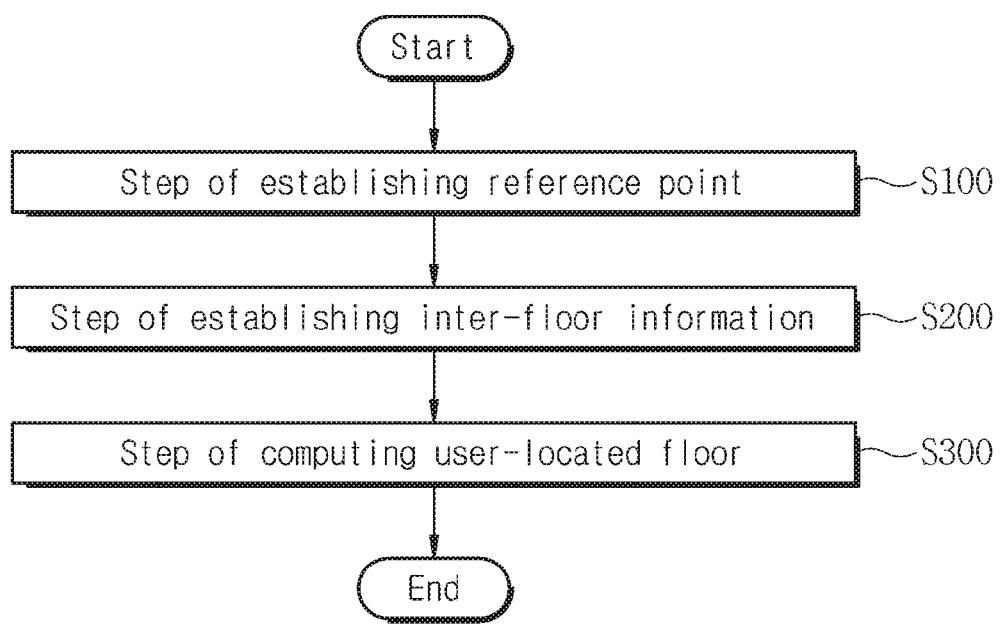
FIG. 10 is a flow diagram illustrating a location estimating method according to another embodiment of the present invention.

FIG. 10 is a flow diagram illustrating a location estimating method according to another embodiment of the present invention.

Referring to FIG. 10, the location estimating method according to this embodiment may be performed by a certain device capable of location estimation, for example, by the user device 100. Specifically, while performing the above-discussed method shown in FIG. 9, the user device 100 may determine entrance into a building and, if it is determined that the user device 100 enters the building, perform subsequent steps, namely, step of establishing a reference point for location estimation (step S100), step of establishing inter-floor information (step S200), and step of computing a user-located floor (step S300) by using a current altitude value, the reference point, and the inter-floor information.

Details will be described hereinafter with reference to FIGS. 11 to 16.

Figure 11:
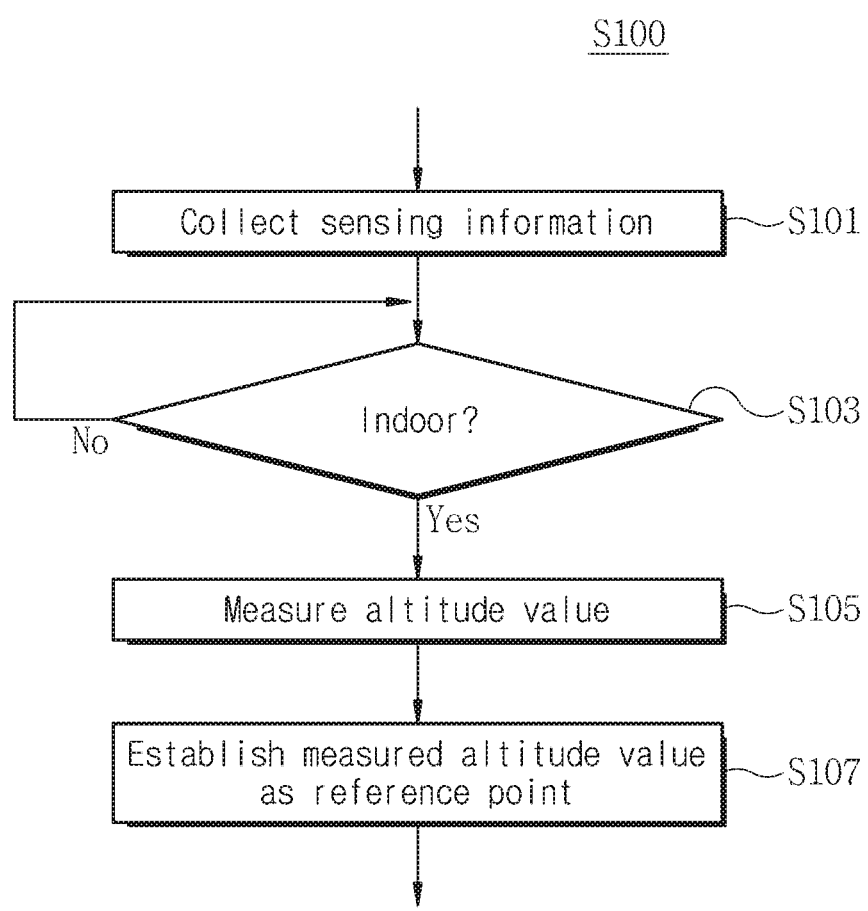
FIGS. 11 to 16 are flow diagrams illustrating details of the location estimating method shown in FIG. 10 according to another embodiment of the present invention.

First, FIG. 11 shows in detail a step of establishing the reference point in this embodiment.

Referring to FIGS. 1 and 11, the user device 100 collects, at regular intervals, sensing information by using various kinds of hardware sensor resources equipped therein (step S101).

This sensing information is required for determining whether a user (i.e., the user device 100) enters a building (i.e., moves to an indoor position from the outside). For example, the user device 100 may collect information about a variation of surrounding illumination through an illumination sensor, collect information about surrounding noise, or collect information about a variation of temperature.

Then, based on the collected sensing information, the user device 100 determines whether a user is located at an indoor position (step S103).

For example, if the collected sensing information indicates summer and daytime and also indicates a variation of temperature from a high temperature to a low temperature, the user device 100 may determine that a user moves to an indoor position from the outside. In another example, if the collected sensing information indicates midday and also indicates a variation of illumination from a bright state to a dark state, the user device 100 may determine that a user moves to an indoor position from the outside.

In still another example, if the user device 100 sends a beacon signal to the service device 300 and then receives location information corresponding to the beacon signal from the service device 300, and if this beacon signal is sensed, the user device 100 may determine that a user moves to an indoor position from the outside.

The user device 100 may have various conditions to be used for determining whether a user moves to an indoor position from the outside. Such conditions may be set by a user or the service device 300. Also, such conditions may be varied depending on hardware resources in the user device 100. Additionally, at least one kind of sensing information, if necessary, any combination of some kinds of sensing information, may be collected and used for determining a movement to an indoor position from the outside.

If it is determined at step S103 that a user is located at an indoor position, the user device 100 measures a current altitude value by using an altitude sensor (step S105).

Then the user device 100 establishes the measured altitude value as a reference point (step S107). At this step, the reference point refers to the first floor of a building.

Next, the above-mentioned step of establishing inter-floor information will be described in detail with reference to FIGS. 12 to 14.

Figure 12:
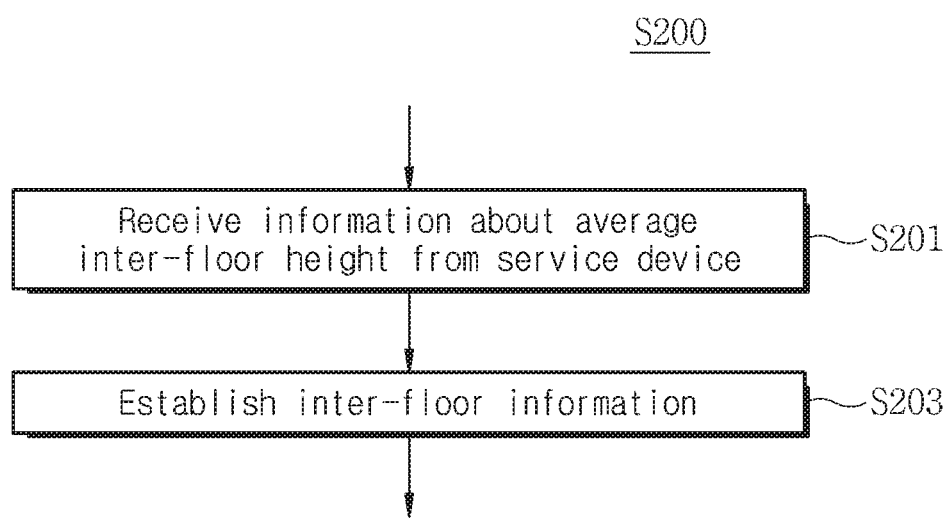
Figure 13:
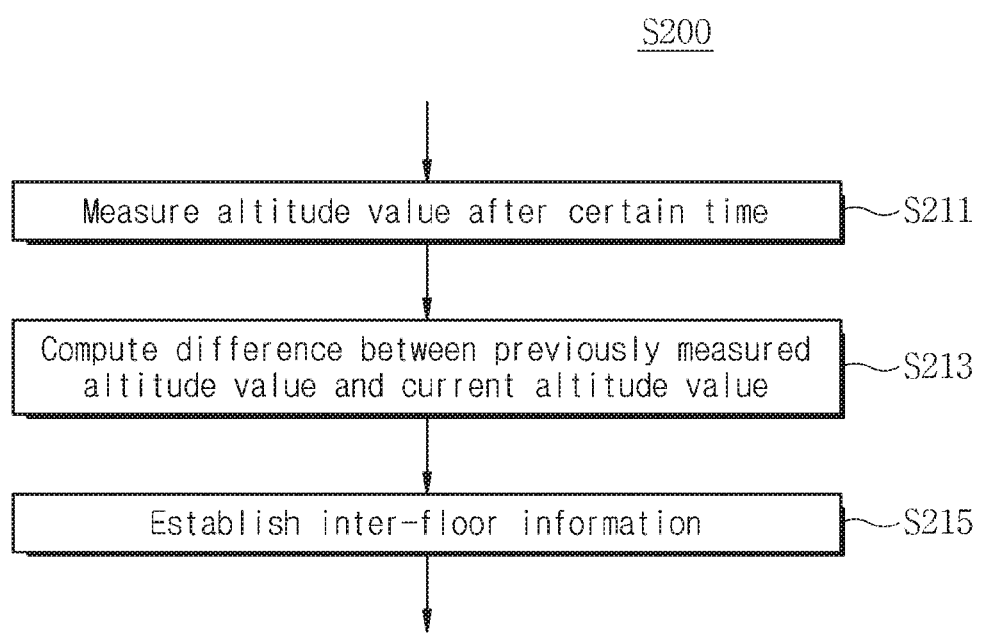
Figure 14:
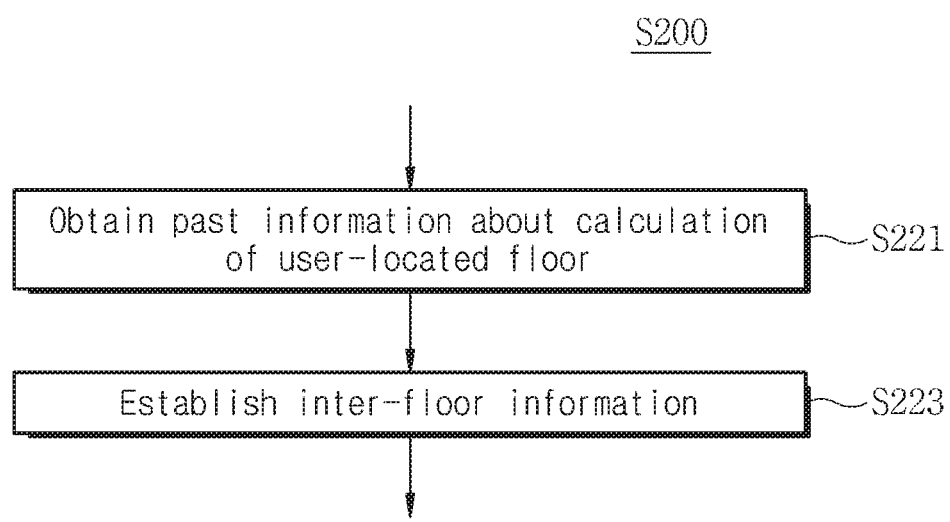

This step of establishing inter-floor information may be performed according to three embodiments, which are shown in FIGS. 12 to 14, respectively.

Referring to FIG. 12, after the reference point is established, the user device 100 establishes inter-floor information.

Specifically, the user device 100 may request and receive information about an average inter-floor height from the service device 300 (step S201). When the requested information about an average inter-floor height is received, the user device 100 may establish the received information as the inter-floor information.

Although an inter-floor height of a building is generally prescribed as 4 m according to building codes, an average inter-floor height may be varied for various reasons. Therefore, rather than simply using a legally prescribed height the an average inter-floor height, the user device 100 may request and receive the average inter-floor height from the service device 300 so as to set and use more exact inter-floor information.

Additionally, when moved in the building, the user device 100 may check whether there is a beacon signal received. If there is a beacon signal, the user device 100 may extract beacon identification information from the beacon signal and transmit the extracted information to the service device 300. Then the service device 300 may identify building information and attribute information corresponding to the beacon signal, identify more exact information about an average inter-floor height, and offer it to the user device 100.

Meanwhile, according to another embodiment, the user device 100 may periodically measure an altitude value and, based on this, establish inter-floor information. This embodiment will be described hereinafter.

Referring to FIG. 13, when a predetermined time elapses after the reference point is established (i.e., when a given time passes after the initial altitude value is measured), the user device 100 measures a current altitude value (step S211).

Then the user device 100 computes a difference between the previously measured altitude value and the current altitude value (step S213) and establishes the computed difference as the inter-floor information (step S215). For example, if a user moves upstairs from the first floor to the second floor, the user device 100 may measure an altitude value in a certain time determined considering an average moving time after the initial measurement on the first floor and then set, as the inter-floor information, a difference between the previous altitude value and the current altitude value.

Also, the user device 100 may obtain a current altitude value after setting the reference point and then establish inter-floor information by dividing a difference between the current altitude value and the previous altitude value by an average inter-floor height. By repeating this process at regular intervals, it is possible to obtain a more exact average inter-floor height.

Meanwhile, according to still another embodiment, the user device 100 may also establish the average inter-floor information by using past information. This embodiment will be described hereinafter.

Referring to FIG. 14, the user device 100 checks whether there is any past information about calculation of a user-located floor (step S221). At this step, the user device 100 may obtain building identification information and then find past measurement information or inter-floor information previously stored with the building identification information.

The building identification information may include or correspond to beacon identification information of a beacon signal collected in the building or any other information which may occur in the building, such as building entry authentication information or payment information in a store residing in the building.

The user device 100 may send such building identification information to the service device 300 and then receive related past information or data from the service device 300. In this case, any information measured by other users in the same building may be used.

Namely, the user device 100 transmits building identification information to the service device 300. Then the service device 300 that receives the building identification information checks whether there is corresponding past information measured by other users in the same building. For example, if information measured by a certain user is 'eight floor, 21.6 m', the service device 300 may obtain an average inter-floor height by comparing this invention with an altitude value measured as the reference point by the user device 100 and then send it to the user device 100. Then, based on this, the user device 100 may establish the inter-floor information (step S223).

Next, the above-mentioned step of computing a user-located floor will be described in detail with reference to FIGS. 15 and 16.

Figure 15:
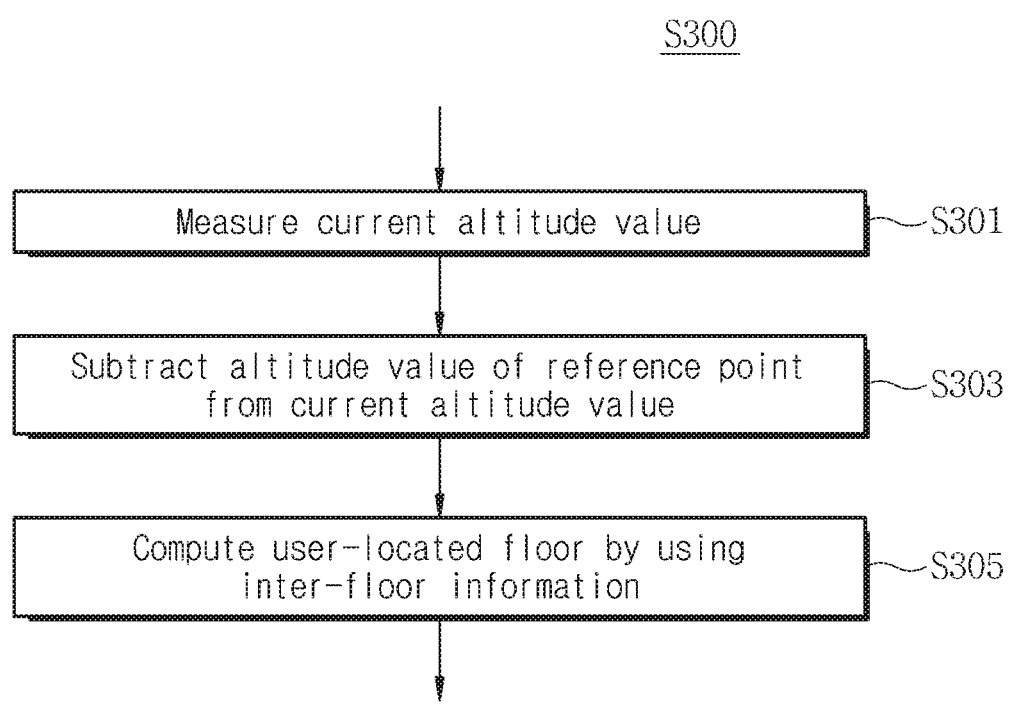
Figure 16:
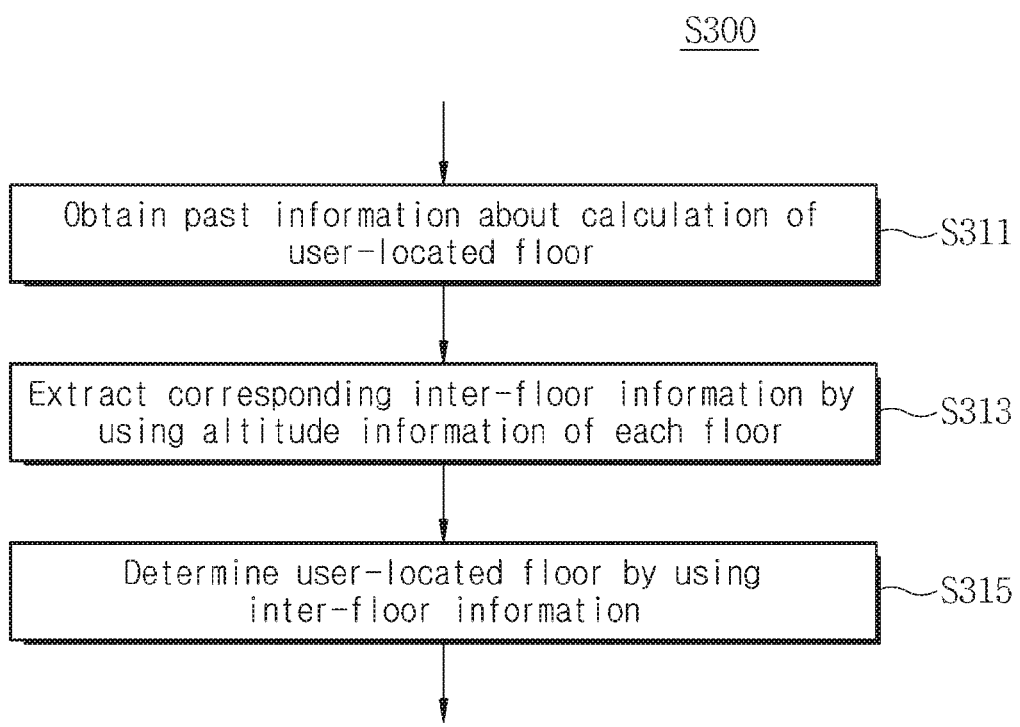

This step of computing a user-located floor may be performed according to two embodiments, which are shown in FIGS. 15 and 16, respectively.

Referring to FIG. 15, after the inter-floor information is established, the user device 100 measures a current altitude value (step S301).

Then the user device 100 subtracts an altitude value of the reference point, measured at step S105 in FIG. 11, from the measured current altitude value (step S303).

Then the user device 100 computes a user-located floor by dividing such a subtraction result by an average inter-floor height (step S305). For example, if the current altitude value is 50 m, if the altitude value established as the reference point is 5 m, and if the average inter-floor height is 5 m, a height obtained by subtracting the reference point from the current altitude value becomes 45 m, and a final value obtained by dividing this height by the average inter-floor height becomes 9. Therefore, the user device 100 can ascertain that a user is located on the ninth floor.

Meanwhile, according to another embodiment, the user device 100 may ascertain a user-located floor by using past data. This embodiment will be described hereinafter.

Referring to FIG. 16, the user device 100 checks whether any past information about the computation of a user-located floor is stored for the same building (step S311). This past information may be stored in the user device 100 or received from the service device 300.

Then the user device 100 extracts corresponding inter-floor information by using the past information about altitude values of respective floors (step S313) and determines a user-located floor by using the extracted inter-floor information (step S315). For example, if the current altitude value is 50 m and if there is past floor information corresponding to 50 m, the user device 100 may determine a user-located floor by using the corresponding past floor information.

In this case, the user device 100 may set a certain range in view of sensing sensitivity. For example, if the current altitude value is 50 m and if there is past floor information within such a range, e.g., 48 m, rather than 50 m, the user device 100 may use such past floor information as floor information corresponding to the current altitude value.

When a user-located current floor is determined through the above process, the user device 100 may store the determined data to utilize in the location estimation.

The above-discussed methods for location estimation according various embodiments of this invention may be implemented by a program recorded in a storage medium and installed, read and executed in and by a computer.

These programs may include codes in programming languages such as C, C++, JAVA and machine codes readable by a computer processor or CPU so that the computer reads the programs recorded in recording media to conduct the foregoing functionalities.

The codes may include functional codes related to functions defining the aforementioned functionalities and control codes related to an execution procedure needed for the computer processor to execute the functionalities according to a preset procedure. Further, the codes may further include memory reference related codes regarding additional information needed for the computer processor to perform the functionalities or a location or address of an internal or external memory that media refer to. In addition, when the computer processor needs communications with a remote computer or server to perform the functionalities, the codes may further include communication related codes regarding how the computer processor communicates with which remote computer or server using a wire-based and/or wireless communication module and what kind of information or media the computer processor transmits or receives in communications.

The computer-readable storage medium suitable for storing computer program commands and data may include magnetic media such as a hard disk, a floppy disk and a magnetic tape, optical media such as CD-ROM (Compact Disk Read Only Memory) and DVD (Digital Video Disk), magneto-optical media such as a floptical disk, and semiconductor memories such as ROM (Read Only Memory), RAM (Random Access Memory), flash memory, EPROM (Erasable Programmable ROM) and EEPROM (Electrically EPROM). A processor and memory may be supplemented by a special-purpose logic circuit or integrated therewith.

Further, the computer-readable recording media including the programs may be distributed to a computer system connected via a network, and accordingly computer-readable codes may be stored and implemented in distributed mode. Functional programs, relevant codes and code segments to implement the present invention may be readily inferred or modified by programmer skilled in the art in view of a system configuration of the computer that reads the recording media to execute the programs.

Respective steps in embodiments of this invention may be implemented in computer-executable commands and executed by a computing system. This computing system is defined as one or more software modules, one or more hardware module, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network.

Likewise, a computer system may include a single physical device where internal modules, such as a memory and processor, work together to perform operations on electronic data.

Namely, a device for performing the location estimating method according to this invention may be implemented to perform the above-discussed embodiments based on a computing system to be described hereinafter.

Figure 17:
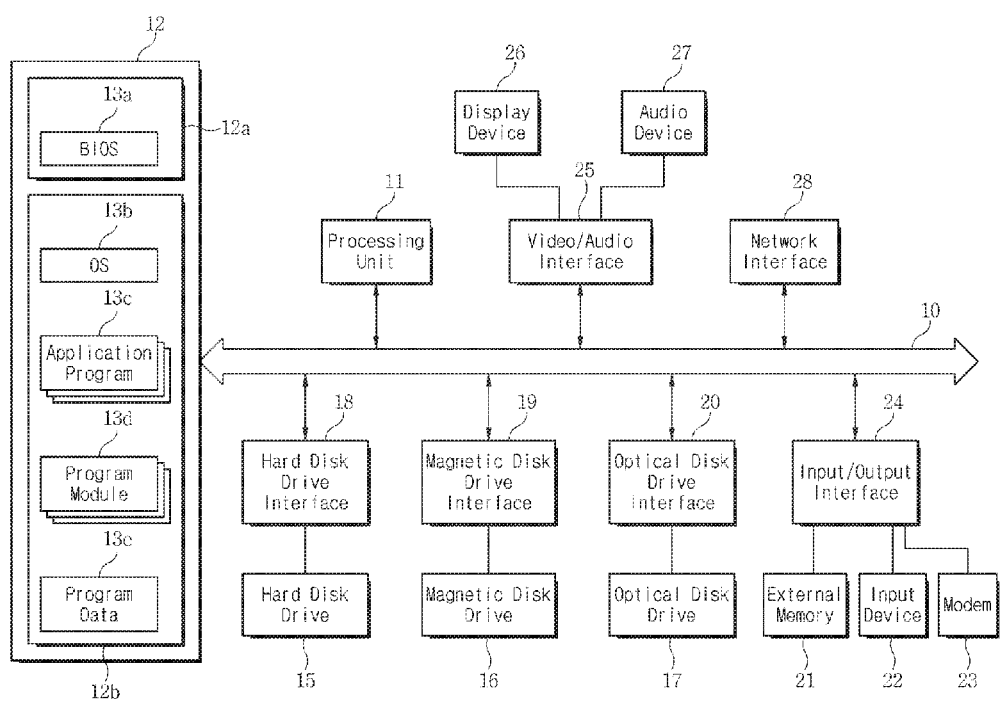
FIG. 17 is a block diagram illustrating an operating environment of devices for the location estimating method according to embodiments of the present invention.

FIG. 17 is a block diagram illustrating an operating environment of devices for the location estimating method according to embodiments of the present invention.

FIG. 17 and the following discussion are intended to provide a brief, general description of an example suitable computing environment in which the invention may be implemented. Although not required (e.g., when implemented in hardware), the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

Referring to FIG. 17, an exemplary computing system for implementing the invention includes a processing unit 11, a system memory 12, and a system bus 10 that couples various system components including the system memory 12 to the processing unit 11.

The processing unit 11 can execute computer-executable instructions designed to implement features of this invention.

The system bus 10 may be any of several, types of bus structures including a memory bus or memory controller, a peripheral bus, and a local bus using any of a variety of bus architectures.

The system memory 12 includes read only memory (ROM) 12a and random access memory (RAM) 12b.

A basic input/output system (BIOS) 13a, containing the basic routines that help transfer information between elements within computer system, such as during start-up, may be stored in the ROM 12a.

The computing system may also include a storage unit, e.g., a hard disk drive 15 for reading from and writing to a hard disk, a magnetic disk drive 16 for reading from or writing to a magnetic disk, and an optical disk drive 17 for reading from or writing to an optical disk such as a CD-ROM or other optical media. The hard disk drive 15, the magnetic disk drive 16, and the optical disk drive 17 are connected to the system bus 10 by a hard disk drive interface 18, a magnetic disk drive-interface 19, and an optical drive interface 20, respectively.

Additionally, the computing system may further include an external memory 21 as the storage unit. The external memory 21 may be connected to the system bus 10 through an input/output interface 24.

The drives and their associated computer-readable media provide nonvolatile storage of computer-executable instructions, data structures, program modules, and other data for the computing system. Although the example environment described herein employs the hard disk 15, the magnetic disk 16 and the optical disk 17, other types of computer readable media for storing data can be used, including magnetic cassettes, flash memory cards, digital versatile disks, Bernoulli cartridges, RAMs, ROMs, and the like.

Program code means including one or more program modules, such as an operating system 13b, one or more application programs 13c, other program modules 13d, and program data 13e, may be stored on the hard disk 15, the magnetic disk 16, the optical disk 17, the ROM 12a, or the RAM 12b.

A user may enter commands and information into the computing system through other input device 22 such as a keyboard, a pointing device, a microphone, a joy stick, a game pad, or the like. This other input device 22 can be connected to the processing unit 11 through the input/output interface 24 coupled to the system bus 10. The input/output interface 24 may logically represent any of a wide variety of different interfaces, such as, for example, a serial port interface, a PS/2 interface, a parallel port interface, a universal serial bus (USB) interface, or an institute of electrical and electronics engineers (IEEE) 1394 interface (i.e., a FireWire interface), or may even logically represent a combination of different interfaces.

Additionally, the computing system may further include a display device 26 such as a monitor or LCD and/or an audio device 27 such as a speaker or a microphone, which are connected to the system bus 10 via a video/audio interface 25. The video/audio interface 25 may include high definition multimedia interface (HDMI), graphics device interface (GDI), or the like.

The computing system is connectable to networks, such as, for example, an office-wide or enterprise-wide computer network, a home network, an intranet, and/or the Internet. The computing system can exchange data with external sources, such as, for example, remote computer systems, remote applications, and/or remote databases over such networks.

The computing system includes a network interface 28, through which the computing system receives data from external sources and/or transmits data to external sources. The network interface 28 facilitates the exchange of data with remote devices. For example, if the computing system is the terminal device 300, the terminal device 300 may transmit or receive information to or from the content server 400 through the network interface 28. If the computing system is the content server 400, the content server 400 may transmit or receive information to or from the set-top box 200 and the terminal device 300 through the network interface 28. The network interface 28 can logically represent one or more software and/or hardware modules, such as, for example, a network interface card and corresponding network driver interface specification (NDIS) stack.

Likewise, the computing system receives and/or transmits data from and/or to external sources through the input/output interface 24. The input/output interface 24 is coupled to a modem 23 (e.g., a standard modem, a cable modem, or a digital subscriber line (DSL) modem), through which the computing system receives data from and/or transmits data to external sources.

While FIG. 17 represents a suitable operating environment for the present invention, the principles of the present invention may be employed in any system that is capable of, with suitable modification if necessary, implementing the principles of the present invention. The environment illustrated in FIG. 17 is illustrative only and by no means represents even a small portion of the wide variety of environments in which the principles of the present invention may be implemented.

Various kinds of information generated during the execution of a beacon-based payment service at the beacon service system of this invention may be stored and accessed from any of the computer-readable media associated with the computing system as shown in FIG. 17. For example, portions of such modules and portions of associated program data may be included in the operating system 13b, the application programs 13c, the program modules 13d and/or the program data 13e, for storage in the system memory 12.

When a mass storage device such as the hard disk is coupled to the computing system, such modules and associated program data may also be stored in the mass storage device. In a networked environment, program modules depicted relative to the computing system, or portions thereof, can be stored in a remote computer system connected through the modem 23 or network interface 25 of the input/output interface 24. Execution of such modules may be performed in a distributed environment as previously described.

While the specification contains many specific implementation details, these should not be construed as limitations on the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Also, although the present specifications describe that operations are performed in a predetermined order with reference to a drawing, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

While this disclosure has been particularly shown and described with reference to an exemplary embodiment thereof, it will be understood by those skilled in the art that various changes in form and details may be made therein without departing from the scope of this disclosure as defined by the appended claims.

The present invention has a good possibility of sales on the market or business and also has industrial applicability suitable for practical and apparent implementation.

What is claimed is:

1. A location estimating method comprising:
   measuring, by a user device, received signal strength of a signal received from at least one access point device deployed within a specific range;
   establishing, by the user device, binding boxes for location estimation based on the measured received signal strength;
   extracting, by the user device, points of contact between the established binding boxes to estimate the current location of the user device using the extracted points of contact;
   determining, by the user device, whether the user device enters a building;

establishing, by the user device, a current altitude value as a reference point for location estimation if it is determined that the user device enters a building;

obtaining, by the user device, identification information on the building;

establishing, by the user device, inter-floor information using information on an average inter-floor height of the building or previously stored past information on an altitude distribution for each floor of the building;

measuring, by the user device, the current altitude value; and computing, by the user device, the floor on which a user is located based on the measured current altitude value, the altitude value established as the reference point, and the established inter-floor information.

2. The method of claim 1, further comprising step of:
after the step of measuring the received signal strength, selecting at least one of the two or more AP devices in view of the received signal strength greater than a predetermined value.

3. The method of claim 1, wherein the step of establishing the binding box includes steps of:
identifying a location of the AP device; and
establishing the binding box having the identified location as a center and also having a radius inversely proportional to the measured signal strength.

4. The method of claim 1, wherein the current location of the user device is estimated from a central point of a region formed by the points of contact between the established binding boxes.

5. The method of claim 1, wherein the step of computing the user-located floor includes steps of:
measuring the current altitude value;
obtaining a height by subtracting the altitude value of the reference point from the measured current altitude value; and
computing the user-located floor by using the obtained height and the inter-floor information.

6. The method of claim 1, wherein the step of computing the user-located floor includes steps of:
measuring a current altitude value;
finding past information about an altitude distribution for each floor, the past information being previously stored corresponding to the measured current altitude value; and
computing the user-located floor by using the found past information.

7. A user device comprising a microprocessor to execute:
a signal receiving module configured to receive a signal from at least one access point devices deployed within a specific range;
a signal strength measuring module configured to measure received signal strength of the signal received by the signal receiving module;
a binding box processing module configured to establish a binding boxes for location estimation based on the received signal strength measured by the signal strength measuring module;
a location determining module configured to extract points of contact between established binding boxes and then the current location of the user device using the extracted points of contact;
a sensing information collecting module configured to collect sensing information required for determining whether the user device enters a building, and collect information on an altitude value;

a reference point setting module configured to establish a reference point for location estimation if it is determined that the user device enters a building;
an inter-floor information setting module configured to establish inter-floor information; and
a user-location floor computing module configured to measure a current altitude value, and then compute the floor on which a user is located based on the measured current altitude value, the altitude value established as the reference point, and the established inter-floor information.

8. The user device of claim 7, further comprising:
a filtering module configured to select at least one of the two or more AP devices in view of the received signal strength greater than a predetermined value.

9. The user device of claim 8, wherein the binding box processing module is further configured to establish the binding box by using the received signal strength of the signal received from the at least one AP device selected by the filtering module.

10. The user device of claim 7, wherein the binding box processing module is further configured to identify a location of the AP device, and to establish the binding box having the identified location as a center and also having a radius inversely proportional to the measured signal strength.

11. The user device of claim 7, wherein the location determining module is further configured to estimate the current location of the user device from a central point of a region formed by the points of contact between the established binding boxes.

12. The user device of claim 7, further comprising:
a service device interworking module configured to transmit, to a service device, identification information of the AP devices and the measured received signal strength, and to receive, from the service device, current location information estimated by the service device.

13. The user device of claim 7, wherein the inter-floor information setting module is further configured to establish the inter-floor information by using information about an average inter-floor height of the building or by using past information about an altitude distribution for each floor of the building.

14. The user device of claim 7, wherein the user-located floor computing module is further configured to measure the current altitude value, to obtain a height by subtracting an altitude value of the reference point from the measured current altitude value, and to compute the user-located floor by using the obtained height and the inter-floor information.

15. A system comprising:
a user device configured to receive a signal from at least one access point device deployed within a specific range, to measure received signal strength of the received signal, to transmit the measured received signal strength and identification information on the access point device to a service device,
determine whether the user device enters a building, establish a current altitude value as a reference point for location estimation if it is determined that the user device enters a building, establish inter-floor information, measure a current altitude value, and compute the floor on which a user is located based on the measured current altitude value, the altitude value established as the reference point, and the established inter-floor information; and the service device configured to receive the identification information on the access point device and the measured signal strength from the user device, establish a binding box for each of the access point devices based on the received signal strength, extract points of contact between the established binding boxes, and estimate a current location of the user device by using the exact points of contact.

* * * * *